United States Patent
Taki et al.

(10) Patent No.: US 11,566,677 B2
(45) Date of Patent: Jan. 31, 2023

(54) ALKALI METAL TITANATE, METHOD FOR PRODUCING ALKALI METAL TITANATE, AND FRICTION MATERIAL

(71) Applicant: TOHO TITANIUM CO., LTD., Chigasaki (JP)

(72) Inventors: Daisuke Taki, Chigasaki (JP); Hideki Sakai, Chigasaki (JP)

(73) Assignee: TOHO TITANIUM CO., LTD., Yokohama (JP)

(*) Notice: Subject to any disclaimer, the term of this patent is extended or adjusted under 35 U.S.C. 154(b) by 513 days.

(21) Appl. No.: 16/648,803

(22) PCT Filed: Jul. 27, 2018

(86) PCT No.: PCT/JP2018/028209
§ 371 (c)(1),
(2) Date: Mar. 19, 2020

(87) PCT Pub. No.: WO2019/058761
PCT Pub. Date: Mar. 28, 2019

(65) Prior Publication Data
US 2020/0217383 A1 Jul. 9, 2020

(30) Foreign Application Priority Data
Sep. 21, 2017 (JP) .............................. JP2017-181282

(51) Int. Cl.
*F16D 69/02* (2006.01)
*C01B 33/32* (2006.01)

(52) U.S. Cl.
CPC ............ *F16D 69/027* (2013.01); *C01B 33/32* (2013.01); *C01P 2002/52* (2013.01); *F16D 2200/0043* (2013.01); *F16D 2200/0086* (2013.01)

(58) Field of Classification Search
None
See application file for complete search history.

(56) References Cited

U.S. PATENT DOCUMENTS

| | | | | |
|---|---|---|---|---|
| 8,398,952 B2 * | 3/2013 | Tanimizu | ............. | C01G 23/005 423/598 |
| 2016/0312846 A1 * | 10/2016 | Miyaji | ................. | F16D 69/027 |

FOREIGN PATENT DOCUMENTS

| | | | |
|---|---|---|---|
| CN | 103797085 A | * | 5/2014 |
| CN | 106903456 A | | 6/2017 |
| EP | 2381123 A1 | * | 10/2011 |
| JP | H10-43043 A | | 2/1998 |
| JP | 2008-266131 A | | 11/2008 |
| JP | 2009-67639 A | | 4/2009 |
| JP | 2009-114051 A | | 5/2009 |
| JP | 2010-30813 A | | 2/2010 |
| KR | 20110118592 A | * | 10/2011 |
| WO | WO2007114284 A1 | * | 10/2007 |
| WO | 2008/123046 A1 | | 10/2008 |
| WO | WO2014098213 A1 | * | 6/2014 |
| WO | 2016/194531 A1 | | 12/2016 |

OTHER PUBLICATIONS

International Search Report dated Sep. 4, 2018, issued in counterpart application No. PCT/JP2018/028209, w/English translation (5 pages).
Written Opinion dated Sep. 4, 2018, issued in counterpart application No. PCT/JP2018/028209 (3 pages).
Extended European Search Report dated May 12, 2021, issued in counterpart EP Application No. 18859266.1. (6 pages).

* cited by examiner

*Primary Examiner* — Melody M Burch
(74) *Attorney, Agent, or Firm* — WHDA, LLP

(57) ABSTRACT

Provided is an alkali metal titanate which, when used as a constituent material of a friction material, is excellent in heat resistance and friction force and capable of effectively suppressing wear of a mating material disposed to face the friction material. The alkali metal titanate includes a sodium atom and a silicon atom. The content of the sodium atom is 2.0 to 8.5 mass %. The content of the silicon atom is 0.2 to 2.5 mass %. The ratio of the content of an alkali metal atom other than the sodium atom to the content of the sodium atom is 0 to 6.

16 Claims, No Drawings

ALKALI METAL TITANATE, METHOD FOR PRODUCING ALKALI METAL TITANATE, AND FRICTION MATERIAL

TECHNICAL FIELD

The present invention relates to an alkali metal titanate, a method for producing the alkali metal titanate, and a friction material.

BACKGROUND ART

Alkali metal titanates are materials useful for a friction material for a friction sliding member such as a brake lining, a disk pad, and a clutch fading, which constitutes a braking device for an automobile, a railway vehicle, an aircraft, an industrial machine, and the like.

Among the alkali metal titanates, potassium titanate is represented by the general formula $K_2O \cdot nTiO_2$, wherein n is an integer of 1 to 12, and potassium hexatitanate, wherein n is 6, has a tunnel crystal structure. Friction materials containing the potassium hexatitanate fiber (fibrous particles) are known to be particularly excellent in heat resistance and the like.

For example, Patent Literature 1 (Japanese Patent Application Publication No. 2009-114051) discloses a potassium titanate comprising a hollow spherical alkali metal titanate, the potassium titanate being obtained by spray-drying a solvent slurry of alkali metal titanate particles and an inorganic oxide powder having a Mohs hardness of 6 to 8 and heat treating the spray-dried product, and discloses that a brake material including the potassium titanate is suitable for improving wear resistance.

CITATION LIST

Patent Literature

[Patent Literature 1] Japanese Patent Application Publication No. 2009-114051

SUMMARY OF INVENTION

Technical Problem

As a result of investigation by the present inventors, it has been found that the above-mentioned potassium titanate has a high Mohs hardness and is thus liable to cause surface wear of the mating material disposed to face the friction material, such as a brake disc, and there is a need to provide a brake material capable of sufficiently suppressing wear of a mating material while maintaining high slidability as a constituent material of an automotive friction material.

In this regard, it is known that when fibrous potassium titanate (fibrous potassium titanate particles) is used as a constituent material of a friction material such as a brake pad, the fibrous potassium titanate forms a protective film called a transfer film on the surface and can improve the slidability while protecting the mating material disposed to face the friction material such as a brake disc. However, many of the fibrous potassium titanate particles have an average fiber diameter of 0.1 to 0.5 µm and an average fiber length of 10 to 20 µm, which are outside the ranges recommended by the World Health Organization (WHO). Thus, it is necessary to perform special processes such as fine adjustment of a raw material calcining temperature or defibration classification of an obtained fibrous material, which complicates the producing process and increases the producing cost.

In addition, alkali metal titanates containing an alkali metal atom other than potassium, such as sodium titanate, have insufficient hardness when used as a constituent material of a friction material, and therefore, further improvement has been demanded for achieving both the slidability and the wear resistance for a brake.

Under such circumstances, an object of the present invention is to provide an alkali metal titanate containing a sodium atom which, when used as a constituent material of a friction material, is not only excellent in heat resistance and friction force but also capable of effectively suppressing wear of an oppositely disposed mating material, and a method for producing the alkali metal titanate and a friction material.

Solution to Problem

In order to solve the above technical problems, the present inventors have made intensive studies and found the following: even in the case of an alkali metal titanate containing a sodium atom, when the alkali metal titanate has a content of the sodium atom controlled within a predetermined range and contains the silicon atom in a predetermined amount, the alkali metal titanate, when used as a constituent material of a friction material, has a predetermined hardness, and is not only excellent in friction force but also capable of effectively suppressing wear of an oppositely disposed mating material, thereby completing the present invention.

That is, the present invention provides:

(1) an alkali metal titanate, including a sodium atom and a silicon atom,
in which a content of the sodium atom is 2.0 to 8.5 mass %,
a content of the silicon atom is 0.2 to 2.5 mass %, and
a ratio of a content of an alkali metal atom other than the sodium atom to the content of the sodium atom is 0 to 6 in mass ratio;

(2) the alkali metal titanate according to (1), in which the silicon atom is contained in a form of a silicon oxide or a silicate;

(3) the alkali metal titanate according to (1) or (2), in which the alkali metal atom other than the sodium atom is at least one selected from a lithium atom and a potassium atom;

(4) a method for producing the alkali metal titanate according to (1), including the steps of: mixing a titanium raw material, an alkali metal raw material containing a sodium atom, and a silicon raw material; and calcining a resulting mixture;

(5) the method for producing the alkali metal titanate according to (4), in which the alkali metal raw material is an alkali hydroxide, an alkali carbonate, or an alkali-containing mineral; and (6) a friction material which is a material containing 5 to 60 mass % of the alkali metal titanate according to any one of (1) to (3).

Advantageous Effects of Invention

According to the present invention, even in the case of an alkali metal titanate containing a sodium atom, when the alkali metal titanate has a content of the sodium atom controlled within a predetermined range and contains the silicon atom in a predetermined range, the alkali metal titanate, when used as a constituent material of a friction material, exhibits a predetermined Vickers hardness, and is not only excellent in heat resistance and friction force but also capable of effectively suppressing wear of a mating material disposed to face the friction material.

Therefore, according to the present invention, provide are an alkali metal titanate which, when used as a constituent material of a friction material, is excellent in heat resistance and friction force and capable of effectively suppressing wear of a mating material disposed to face the friction material, and also a method for producing the alkali metal titanate and a friction material.

DESCRIPTION OF EMBODIMENTS

First, an alkali metal titanate of the present invention will be described.

The alkali metal titanate according to the present invention is an oxide including a sodium atom and a silicon atom, in which a content of the sodium atom is 2.0 to 8.5 mass %, a content of the silicon atom is 0.2 to 2.5 mass %, and a ratio of a content of an alkali metal atom other than the sodium atom to the content of the sodium atom is 0 to 6 in mass ratio, and the alkali metal titanate according to the present invention is also referred to as an alkali metal titanate compound.

In the alkali metal titanate according to the present invention, the silicon atom is preferably contained in the alkali metal titanate in a form of a silicon oxide or a silicate, more preferably in a form of one or more selected from silicon dioxide, potassium silicate, and sodium silicate, still more preferably in a form of one or more selected from silicon dioxide and sodium silicate, and particularly preferably in a form of silicon dioxide.

It is considered that in the alkali metal titanate according to the present invention, the silicon atoms are usually present in a form of a silicon oxide or a silicate in a gap between crystals formed of alkali metal titanate crystals, in a so-called mixed state.

The alkali metal titanate according to the present invention contains the silicon atom in an amount of 0.2 to 2.5 mass %, preferably 0.3 to 2.0 mass %, and more preferably 0.3 to 1.6 mass %.

When the content of the silicon atom in the alkali metal titanate is within the above range, the hardness of a friction material can be easily controlled in an optimum range while maintaining the friction force at a high level, when the alkali metal titanate according to the present invention is used as a constituent material of the friction material.

In the present application, the content of the silicon atom in the alkali metal titanate means a value measured, using an inductively coupled plasma (ICP) emission spectrometer (Model: SPS 3100, manufactured by Hitachi High-Technologies Corporation), by ICP emission spectroscopy.

The alkali metal titanate according to the present invention contains the sodium atom in an amount of 2.0 to 8.5 mass %, preferably 2.0 to 7.5 mass %, and more preferably 2.0 to 6.5 mass %.

When the content of the sodium atom in the alkali metal titanate is within the above range, the alkali metal titanate according to the present invention has a Vickers hardness (HV) in the range of 250 to 400, which is optimal as a constituent material of a friction material, and when such an alkali metal titanate is used as a constituent material of a friction material, the hardness of the friction material can be easily controlled in an optimum range while maintaining the friction force at a high level.

In the alkali metal titanate according to the present invention, the alkali metal atom other than the sodium atom is preferably one or more selected from a potassium atom, a lithium atom, and a rubidium atom, more preferably one or more selected from a potassium atom and a lithium atom, and still more preferably a potassium atom.

In the alkali metal titanate according to the present invention, the alkali metal atoms other than the sodium atom may be present inside the crystal structure of the alkali metal titanate crystal or some of them may be present outside the crystal structure, as will be described later.

The alkali metal titanate according to the present invention preferably contains the alkali metal atom other than the sodium atom in an amount of 0 to 12 mass %, more preferably 0 to 10 mass %, and still more preferably 3 to 10 mass %.

In the alkali metal titanate according to the present invention, the mass ratio of the content of the alkali metal atom other than the sodium atom to the content of the sodium atom (content of alkali metal atom other than sodium atom (g)/content of sodium atom (g)) is 0 to 6, preferably 0 to 5.5, and more preferably 0.5 to 5.5.

In the alkali metal titanate according to the present invention, when the content ratio of the alkali metal atom other than the sodium atom is within the above range, the alkali metal titanate according to the present invention, when used as a constituent material of a friction material, exhibits a predetermined Vickers hardness, and is not only excellent in friction force but also capable of effectively suppressing the wear of a mating material disposed to face the friction material.

In the present application, the content of the alkali metal atom in the alkali metal titanate means a value measured, using an inductively coupled plasma (ICP) emission spectrometer (Model: SPS 3100, manufactured by Hitachi High-Technologies Corporation), by ICP emission spectroscopy.

The main crystal of the alkali metal titanate in the alkali metal titanate according to the present invention preferably has a tunnel structure similar to that of potassium hexatitanate. All of the alkali metal atoms other than the sodium atom are usually present inside the crystal structure together with the sodium atom, but the alkali metal titanate also encompasses those in which some of the alkali metal atoms other than the sodium atom are present outside the crystal structure.

Having a tunnel structure similar to that of potassium hexatitanate, the main crystal of the alkali metal titanate in the alkali metal titanate of the present invention may contain, for example, titanium dioxide as an impurity.

In the alkali metal titanate in the alkali metal titanate according to the present invention, the main crystal is preferably represented by the following general formula (I):

$$Na_nM_{(2-n)}Ti_6O_{13} \qquad (I)$$

wherein M is an alkali metal atom other than the sodium atom, and n represents a real number of $0<n\leq 2$.

In the above general formula (I), n is a real number of $0<n\leq 2$, preferably a real number of $0.2\leq n\leq 1.8$, and more preferably a real number of $0.5\leq n\leq 1.5$.

The alkali metal titanate according to the present invention preferably contains the titanium atom in an amount of 40 to 60 mass %, more preferably contains 42 to 58 mass %, and still more preferably contains 45 to 55 mass %.

In the present application, the content of the titanium atom constituting the alkali metal titanate means a value measured, using an inductively coupled plasma (ICP) emission spectrometer (Model: SPS 3100, manufactured by Hitachi High-Technologies Corporation), by ICP emission spectroscopy.

The alkali metal titanate in the alkali metal titanate according to the present invention preferably has a single-phase ratio of 85 to 100%, more preferably 90 to 100%, and still more preferably 95 to 100%.

In the present application, the single-phase ratio of the alkali metal titanate in the alkali metal titanate means a value calculated by the following method.

Specifically, the diffraction pattern of the alkali metal titanate is obtained using a powder X-ray diffractometer (X-ray source: CuKα ray, Model: X'Part-Pro MPD, manufactured by Panalytical Co., Ltd.), and the single-phase ratio is calculated by the following calculation formula from the height of the main peaks of the alkali metal titanate and impurities in the diffraction pattern obtained.

Single-phase ratio (%)=$I/(I+S)\times 100$ where I is the height of the strongest peak of an alkali metal titanate represented by the general formula $Na_nM_{(2-n)}Ti_6O_{13}$ at $2\theta=0$ to $50°$, wherein M is an alkali metal atom other than the sodium atom, and n represents a real number of $0<n\leq 2$, and S is the height of the strongest peak among the peaks of impurities at $2\theta=0$ to $50°$.

Examples of the impurities include $TiO_2$.

The alkali metal titanate according to the present invention preferably has a Vickers hardness (HV) in the range of 250 to 400, more preferably in the range of 250 to 350, and still more preferably in the range of 300 to 350.

In a case where the alkali metal titanate according to the present invention has a Vickers hardness (HV) within the above range, when the alkali metal titanate according to the present invention is used as a constituent material of a friction material, the hardness of the friction material can be easily controlled in an optimum range for effectively suppressing the wear of the mating material disposed to face the friction material ed while maintaining the friction force at a high level.

In the present application, the Vickers hardness of an alkali metal titanate means a found value on a test piece for hardness measurement, which is sintered after molding. Specifically, a test piece is prepared by mixing a 1 mass % polyvinyl alcohol with an alkali metal titanate, press-molding the mixture, and sintering the resulting molded product at $1250°$ C. in the air; the surface of the test piece is polished using a #1200 abrasive; and the Vickers hardness of the polished test piece is automatically measuring using a micro Vickers hardness measuring apparatus (Micro Vickers HM-101, manufactured by Mitutoyo Co., Ltd.). The found value means the Vickers hardness of the alkali metal titanate.

The alkali metal titanate according to the present invention may be suitably produced by a method for producing the alkali metal titanate of the present invention described below.

According to the present invention, provide is an alkali metal titanate which, when used as a constituent material of a friction material, is not only excellent in friction force but also capable of effectively suppressing wear of an opposingly disposed mating material.

Next, a method for producing an alkali metal titanate according to the present invention will be described.

The method for producing an alkali metal titanate according to the present invention relates to a method for producing the alkali metal titanate according to the present invention, which includes the steps of mixing a titanium raw material, an alkali metal raw material containing a sodium atom and a silicon raw material, and calcining a resulting mixture.

In the method for producing the alkali metal titanate according to the present invention, the titanium raw material preferably contains an oxygen atom together with a titanium atom. Specifically, the titanium raw material is preferably one or more selected from titanium oxides such as titanium dioxide, metatitanic acid, orthotitanic acid, rutile ore, and hydrous titania, more preferably one or more selected from titanium oxides, metatitanic acid, orthotitanic acid, and rutile ore, still more preferably one or more selected from titanium oxides and rutile ore, and particularly preferably titanium dioxide.

Titanium dioxide, which is excellent in miscibility and reactivity with alkalis and is inexpensive, can be suitably used as a titanium raw material.

The average particle size of the titanium raw material is preferably from 0.1 to 10 mm, more preferably from 0.5 to 10 mm, and still more preferably from 0.5 to 1 mm, for ease of handling.

In the present application, the average particle size of the titanium raw material means a value measured according to a JIS K 0069 sieving test for chemical products.

The form of the titanium raw material is preferably an aggregate or granulate of the titanium compound. When the titanium raw material is in the form of an aggregate or granulate of the titanium compound, the titanium raw material can be easily and uniformly mixed with other raw materials.

The aggregate or granulate of the titanium compound is preferably an aggregate (including granules) or granulate of titanium dioxide.

In the method for producing the alkali metal titanate according to the present invention, the raw material of the sodium atom (sodium raw material) is preferably, for example, one or more selected from oxides, hydroxides, carbonates, and alkali-containing minerals of the sodium atom, and examples thereof include one or more selected from sodium oxide, sodium carbonate, sodium hydroxide, sodium oxalate, and sodium nitrate. Of these, one or more selected from sodium oxide, sodium carbonate, sodium hydroxide, and the like are preferable, one or more selected from sodium carbonate and sodium hydroxide are more preferable, and sodium carbonate is still more preferable.

In the method for producing the alkali metal titanate according to the present invention, the raw material of the alkali metal atom other than the raw material of the sodium atom is preferably an alkali hydroxide, an alkali carbonate, an alkali nitrate or an alkali-containing mineral of the alkali metal other than the sodium atom.

Specifically, for example, one or more selected from alkali metal hydroxides such as potassium hydroxide, lithium hydroxide, and rubidium hydroxide, alkali metal carbonates such as potassium carbonate, lithium carbonate, and rubidium carbonate, and alkali metal nitrates such as potassium nitrate, lithium nitrate, and rubidium nitrate are preferable; one or more selected from the various potassium compounds and lithium compounds described above are more preferable; one or more compounds selected from potassium compounds such as potassium carbonate, potassium hydroxide, and potassium nitrate are still more preferable; and one or more selected from potassium carbonate and potassium hydroxide are still more preferable.

These alkali metal raw materials are easily melted or decomposed during the calcining reaction to easily react with the titanium compound, and also generates only carbon dioxide gas or water after the decomposition, so that it is difficult for impurities to remain in the product.

In the method for producing the alkali metal titanate according to the present invention, the silicon raw material is preferably one containing silicon oxide and capable of forming a form of a silicon oxide or silicate in the alkali metal titanate, and is preferably, for example, one or more selected from silicon dioxide, an alkali silicate, and silicate-containing minerals, examples of which include one or more selected from silicon dioxide, sodium silicate, potassium silicate, and silicon-containing ores. Of these, one or more selected from silicon dioxide, sodium silicate, and silicon-containing ores are preferable, and one or more selected from silicon dioxide and silicon-containing ores are more preferable.

In the present application, the silicon-containing ore means an ore containing a silicon oxide or silicate in an amount of 1 to 99 mass %, preferably 1 to 50 mass %, and more preferably 1 to 25 mass %, and specific examples thereof include one or more selected from silica ore, silicate ore, rutile ore, magnetite ore, and ilmenite ore. One or more selected from silica ore, silicate ore, rutile ore, and ilmenite ore are more preferable, and one or more selected from silicon-containing titanium ores such as rutile ore and ilmenite ore are still more preferable.

In the method for producing the alkali metal titanate according to the present invention, a titanium raw material, a raw material of an alkali metal atom containing a sodium atom, and a silicon raw material are mixed and then calcined.

In the method for producing the alkali metal titanate according to the present invention, the amount mixed of the titanium raw material, the raw material of the sodium atom, the raw material of the alkali metal atom other than the sodium atom, and the silicon raw material may be appropriately determined in consideration of the titanium atom content, the sodium atom content, the content of the alkali metal atom other than the sodium atom and the silicon content in the alkali metal titanate to be obtained.

In the method for producing the alkali metal titanate according to the present invention, the raw material of the sodium atom and the alkali metal raw material other than the sodium atom are preferably contained in an amount exceeding the theoretical amount by 0 to 15 mol %, more preferably 5 to 15 mol %, and still more preferably 10 to 14 mol %, in consideration of volatilization in the calcining step following the mixing step.

In the method for producing the alkali metal titanate according to the present invention, the composition of the alkali metal titanate as the final product can be easily controlled by adjusting the mixing ratio of the titanium raw material, the raw material of the sodium atom, the raw material of the alkali metal atom other than the sodium atom, and the silicon raw material in the raw material mixture.

In the method for producing the alkali metal titanate according to the present invention, the raw material mixture preferably contains the raw material of the sodium atom and the raw material of the alkali metal atom other than the sodium atom in total of 4 to 20 mass %, more preferably 4 to 15 mass %, and still more preferably 8 to 15 mass %, in terms of the solid content.

In the method for producing the alkali metal titanate according to the present invention, the raw material mixture may further contain a trace amount of other compounds, for example, an inorganic oxide, in addition to the titanium raw material, the alkali metal raw material and the silicon raw material, to the extent that the formation of the alkali metal titanate is not affected.

Examples of the inorganic oxide include one or more selected from $Fe_2O_3$, $Al_2O_3$, $CeO_2$, $WO_3$, $ZrO_2$, $Zr(CO_3)_2$, and $CaCO_3$.

In a case where the raw material mixture further contains the inorganic oxide in addition to the titanium raw material, the raw material of the sodium atom, the raw material of the alkali metal atom other than the sodium atom, and the silicon raw material, the content of the inorganic oxide in the raw material mixture in total is preferably 5 mass % or less, more preferably 3 mass % or less, and still more preferably 1 mass % or less, in terms of the solid content.

In the method for producing the alkali metal titanate according to the present invention, the raw material mixture may be prepared by mixing the titanium raw material, the raw material of the sodium atom, the raw material of the alkali metal atom other than the sodium atom, the silicon raw material, and optionally together with the inorganic oxide and the like. Although these components may be mixed using a dry mixing method or a wet mixing method, it is preferable to use a dry mixing method in view of simplifying the process.

In the method for producing the alkali metal titanate according to the present invention, the raw material mixture is preferably obtained by mixing the titanium raw material, the raw material of the sodium atom, the raw material of the alkali metal atom other than the sodium atom, the silicon raw material, and optionally the inorganic oxide and the like using known mixing means, and the mixing means is preferably at least one selected from mechanical grinding means such as a vibration mill, a vibration rod mill, a vibration ball mill, a bead mill, a turbo mill, and a planetary ball mill, and more preferably a vibration rod mill filled with rod-shaped grinding media.

In the case of mixing the components using a vibration rod mill, the mixing conditions are preferably an amplitude width of 2 mm to 6 mm and a processing time of 10 minutes to 120 minutes.

By mixing with the vibration rod mill, the titanium raw material, the raw material of the sodium atom, the raw material of the alkali metal atom other than the sodium atom, and the silicon raw material can be mixed while being ground. Thus, powder having a large particle size between rods can be ground, and over-grinding of fine powder as in the case of ball milling can be suppressed.

In particular, in the case of using titanium oxide as the titanium raw material, the titanium oxide normally exhibits high adhesion due to a hydroxyl group present on the surface and the specific surface area thereof increases as the particle size decreases. Thus, ground products thereof easily are fixed to the inner side of the device when titanium oxide is overly ground. However, by mixing using the vibration rod mill, it is possible to suppress such fixing of ground products, and uniformly grind and mix the components as compared with other mixing methods.

In the method for producing the alkali metal titanate according to the present invention, the raw material mixture obtained by the mixing process is subjected to a calcining process.

Examples of the method of calcining include calcining the raw material mixture in a state in which the raw material mixture is placed in a reaction vessel; calcining the raw material mixture after adding a binder or the like to the raw material mixture to form a molded body having a desired shape; and introducing the raw material mixture into a rotary kiln or the like and calcining the raw material mixture in a fluidized state. Calcining in a fluidized state in a rotary kiln or the like is preferable in consideration of the calcination profile.

The reaction vessel and the furnace material used during the calcining are preferably made of ceramics, and specific examples thereof include those made of a ceramic material such as alumina. Examples of the shape of the reaction vessel or furnace material used during the calcining include a cylindrical shape, a columnar shape having a concave portion, a rectangular shape having a concave portion, and a plate-like shape.

In the method for producing the alkali metal titanate according to the present invention, the calcining temperature during the calcining is preferably in the range of 900 to 1400° C., more preferably in the range of 950 to 1200° C., and still more preferably in the range of 1050 to 1150° C.

In the method for producing the alkali metal titanate according to the present invention, it is preferable that the calcined product of the alkali metal titanate obtained by the above calcining process be appropriately ground.

Examples of the grinding means during the grinding process include the same mixing means as those described for the preparation of the raw material mixture. Specific examples include one or more selected from a vibration mill (a vibration rod mill, a vibration ball mill, and the like), and an impact grinder (a high-speed rotation mill, a high-speed rotation mill with a built-in classifier, a container driving medium mill, a medium stirring mill, an air flow pulverizer, and the like), and the vibration rod mill is preferable. It is more preferable to grind the calcined powder obtained in the calcining step using a combination of a vibration mill and an impact grinder.

In the case of grinding the calcined product using a vibration rod mill, the grinding conditions are preferably such that the amplitude width is 2 to 6 mm, the feeding rate of the calcined product is 20 to 100 kg/hour, and the processing time is 1.5 to 7.5 hours.

In the case of grinding the calcined product using a high-speed rotation mill with a built-in classifier, the grinding conditions are preferably such that the number of revolutions is 40,000 to 100,000 rpm, the feeding rate of the calcined powder is 20 to 100 kg/hour, and the processing time is 1.5 to 7.5 hours.

The ground product obtained by the grinding process may be optionally classified or sieved to obtain the alkali metal titanate having a desired particle size distribution.

The alkali metal titanate obtained by the production method of the present invention is excellent in heat resistance and, when used as a constituent material of a friction material such as a brake pad, it is excellent in friction force and capable of effectively suppressing wear of an opposingly disposed mating material such as a brake disc. It can thus be suitably used as a constituent material of a friction material.

According to the present invention, provide is a method for simply and inexpensively producing an alkali metal titanate which is excellent in heat resistance and friction force and, when used as a constituent material of a friction material such as a brake pad, capable of effectively suppressing wear of a mating material disposed to face the friction material.

Next, a friction material according to the present invention will be described.

The friction material according to the present invention is a material containing 5 to 60 mass % of the alkali metal titanate according to the present invention.

The friction material according to the present invention is a material containing 5 to 60 mass % of the alkali metal titanate according to the present invention, preferably a material containing 10 to 50 mass % thereof, and more preferably a material containing 10 to 40 mass % thereof.

When the friction material according to the present invention is a material containing the alkali metal titanate according to the present invention at the above ratio, the friction material is excellent in heat resistance and friction force, and capable of effectively suppressing wear of an opposingly disposed mating material.

Specific examples of the friction material according to the present invention include a friction material including a base fiber, a friction modifier including the alkali metal titanate of the present invention, and a binder.

Examples of the base fiber include one or more selected from resin fibers such as aramid fibers, metal fibers such as steel fibers and brass fibers, carbon fibers, glass fibers, ceramic fibers, rock wool, and wood pulp.

These base fibers may be surface-treated with a silane coupling agent such as an aminosilane, an epoxysilane, or a vinylsilane, a titanate coupling agent, a phosphate ester, or the like in order to improve dispersibility and adhesion to the binder.

As the friction modifier, other friction modifiers may be used in combination with the alkali metal titanate of the present invention as long as the effects of the present invention are not impaired.

Examples of the other friction modifiers include one or more selected from organic powders such as vulcanized or unvulcanized natural rubber/synthetic rubber powder, cashew resin powder, resin dust, and rubber dust; inorganic powders such as carbon black, graphite powder, molybdenum disulfide, barium sulfate, calcium carbonate, clay, mica, talc, diatomaceous earth, antigorite, sepiolite, montmorillonite, zeolite, sodium trititanate, sodium pentatitanate, and potassium octatitanate; metal powders such as copper, aluminum, zinc, and iron; and oxide powders such as alumina, silica, chromium oxide, titanium oxide, and iron oxide.

Examples of the binder include at least one selected from organic binders such as thermosetting resins such as phenol resins, formaldehyde resins, melamine resins, epoxy resins, acrylic resins, aromatic polyester resins, and urea resins; elastomers such as natural rubber, nitrile rubber, butadiene rubber, styrene-butadiene rubber, chloroprene rubber, polyisoprene rubber, acrylic rubber, high styrene rubber, and styrene-propylene diene copolymer; and thermoplastic resins such as polyamide resins, polyphenylene sulfide resins, polyether resins, polyimide resins, polyether ether ketone resins, and thermoplastic liquid crystal polyester resins; and inorganic binders such as alumina sols, silica sols, and silicone resins.

Further, in addition to the above-mentioned components, components such as a rust preventive, a lubricant, and an abrasive may be optionally blended.

The friction material according to the present invention preferably has a friction coefficient of 0.1 to 0.6, more preferably 0.2 to 0.6, and still more preferably 0.2 to 0.5.

In the present application, the friction coefficient of the friction material means a value measured in the following manner. The alkali metal titanate according to the present invention having been ground to an average particle size of 50 μm or less and other materials for a blend are placed in a mixer at the ratio shown in Table 1, and mixed; the resulting mixture is calcinated at a surface pressure of 400 kgf/cm$^2$ and a sintering temperature of 170 to 180° C. for 5 minutes, and then formed at a surface pressure of 10 kgf/cm$^2$ and a calcining temperature of 250° C. for 3 hours; the calcined product is polished to prepare the friction material having a brake pad shape; and the friction coefficient of the obtained friction material is measured in accordance with a measurement method defined in JIS D 4411 (1993) "Automotive brake lining and pad".

TABLE 1

| Compound for Blend | Blending ratio (mass %) |
|---|---|
| Alkali titanate | 21 |
| Barium sulfate | 21 |
| Brass fiber | 15 |
| Phenolic resin | 9 |
| Cashew dust | 6 |
| Graphite | 5 |
| Triiron tetroxide | 4 |
| Aramid fiber | 4 |
| Phlogopite | 4 |
| Slaked lime | 2 |
| Zeolite | 2 |
| Rubber dust | 2 |
| Rock wool | 2 |
| Zirconia | 2 |
| Antimony sulfide | 1 |

The method for producing the friction material according to the present invention is not particularly limited, and may be appropriately produced according to methods for producing a friction material known in the related art.

An example of the method for producing the friction material of the present invention is as follows: a base fiber is dispersed in a binder, the alkali metal titanate according to the present invention and other components to be optionally blended are combined and blended to prepare a friction material composition, and then the composition is injected into a mold and heated under pressure to perform binding molding.

Another example is as follows: a binder is melt-kneaded with a twin-screw extruder, a base fiber, the alkali metal titanate according to the present invention and other components to be optionally blended are combined and blended therewith from a side hopper, and the mixture is extruded and machined into a desired shape.

Another example is as follows: the friction material composition according to the present invention is dispersed in water or the like, the dispersion is spread on a paper making net and dehydrated to be formed into a sheet, the sheet is heated and pressed by a press machine for binding molding, and the obtained friction material is appropriately cut and polished to obtain a desired shape.

The friction material according to the present invention includes the alkali metal titanate of the present invention as a raw material therefor, and thus has a stable friction coefficient.

Therefore, the friction material of the present invention can be used as a material for braking members for automobiles, railway vehicles, aircraft, various industrial equipment, and the like, including a material for clutch facings and a material for a brake such as brake linings, and brake pads, to exhibit the effects of improving the braking function and the stability.

EXAMPLES

Next, the present invention will be described more specifically with reference to Examples and Comparative Examples, but the present invention is not limited to the following examples.

Example 1

(1) Preparation of Alkali Metal Titanate 42.5 kg of titanium dioxide (purity 98.7%, manufactured by COSMO CHEMICAL CO., LTD.), 6.1 kg of potassium carbonate (purity 99.9%, manufactured by Unid Co., Ltd.), 14.1 kg of sodium carbonate (purity 99.9%), and 44.1 kg of titanium dioxide containing 1.8 mass % of silicon dioxide (titanium dioxide purity 95%, manufactured by RTFT (Rio Tinto, Fer et Titane)) were mixed with a vibration mill (Model: MB-1, manufactured by Chuo Kakohki Co., Ltd.) to obtain a raw material mixture, and the obtained raw material mixture was placed in a sagger made of cordierite and mullite, calcinated at a temperature of 1100° C. for 1 hour in an air atmosphere. Then, the calcinated product was subjected to grinding process with the vibration mill until the average particle size became 50 μm or less to obtain a powdery alkali metal titanate.

The obtained alkali metal titanate had a titanium atom content of 50.0 mass %, a potassium atom content of 3.6 mass %, a sodium atom content of 6.3 mass %, and a silicon atom content of 0.8 mass %, and the content of the alkali metal atom other than the sodium atom/the content of the sodium atom (mass ratio) was 0.57. The main crystal thereof had a tunnel structure similarly to potassium hexatitanate, and the single-phase ratio thereof was 97%.

The Vickers hardness of a test piece prepared by mixing a 1 mass % polyvinyl alcohol with the obtained alkali metal titanate and then pressing and sintering the mixture at 1250° C. in the air was 302 HV, as measured using a micro Vickers hardness measuring apparatus (Micro Vickers HM-101, manufactured by Mitutoyo Co., Ltd.) after polishing the surface of the test piece using a #1200 abrasive.

Example 2

An alkali metal titanate was prepared in the same manner as in Example 1 except that the amount used of titanium dioxide (titanium dioxide purity: 98.7%) and the amount used of titanium dioxide containing 1.8 mass % of silicon dioxide (titanium dioxide purity: 95%) were changed from 42.5 kg to 63.8 kg and from 44.1 kg to 22.0 kg, respectively.

The obtained alkali metal titanate had a titanium atom content of 50 mass %, a potassium atom content of 3.6 mass %, a sodium atom content of 6.3 mass %, and a silicon atom content of 0.4 mass %, and the content of the alkali metal atom other than the sodium atom/the content of the sodium atom (M/Na mass ratio) was 0.57. The main crystal thereof had a tunnel structure similarly to potassium hexatitanate, and the single-phase ratio thereof was 97%.

The Vickers hardness of the obtained alkali metal titanate was 281 HV.

Example 3

An alkali metal titanate was prepared in the same manner as in Example 1 except that the amount used of potassium carbonate and the amount used of sodium carbonate were changed from 6.1 kg to 18.3 kg and from 14.1 kg to 4.7 kg, respectively.

The obtained alkali metal titanate had a titanium atom content of 50 mass %, a potassium atom content of 10.4 mass %, a sodium atom content of 2.0 mass %, and a silicon atom content of 0.8 mass %, and the content of the alkali metal atom other than the sodium atom/the content of the sodium atom (mass ratio) was 5.2. The main crystal thereof had a tunnel structure similarly to potassium hexatitanate, and the single-phase ratio thereof was 92%.

The Vickers hardness of the obtained alkali metal titanate was 351 HV.

Example 4

An alkali metal titanate was prepared in the same manner as in Example 1 except that the amount used of titanium dioxide (titanium dioxide purity: 98.7%), the amount used of titanium dioxide containing 1.8 mass % of silicon dioxide (titanium dioxide purity: 95%), the amount used of potassium carbonate, and the amount used of sodium carbonate were changed from 42.5 kg to 63.8 kg, from 44.1 kg to 22.0 kg, from 6.1 kg to 18.3 kg, and from 14.1 kg to 4.7 kg, respectively.

The obtained alkali metal titanate had a titanium atom content of 50 mass %, a potassium atom content of 10.4 mass %, a sodium atom content of 2.0 mass %, and a silicon atom content of 0.4 mass %, and the content of the alkali metal atom other than the sodium atom/the content of the sodium atom (mass ratio) was 5.2. The main crystal thereof had a tunnel structure similarly to potassium hexatitanate, and the single-phase ratio thereof was 88%.

The Vickers hardness of the obtained alkali metal titanate was 306 HV.

Example 5

An alkali metal titanate was prepared in the same manner as in Example 1 except that the amount used of potassium carbonate and the amount used of sodium carbonate were changed from 6.1 kg to 0 kg and from 14.1 kg to 18.7 kg, respectively.

The obtained alkali metal titanate had a titanium atom content of 50 mass %, a sodium atom content of 8.5 mass %, and a silicon atom content of 0.8 mass %, and the content of the alkali metal atom other than the sodium atom/the content of the sodium atom (mass ratio) was 0. The main crystal thereof had a tunnel structure similarly to potassium hexatitanate, and the single-phase ratio thereof was 94%.

The Vickers hardness of the obtained alkali metal titanate was 344 HV.

Example 6

An alkali metal titanate was prepared in the same manner as in Example 1 except that the amount used of titanium dioxide (titanium dioxide purity: 98.7%), the amount used of titanium dioxide containing 1.8 mass % of silicon dioxide (titanium dioxide purity: 95%), the amount used of potassium carbonate, and the amount used of sodium carbonate were changed from 42.5 kg to 63.8 kg, from 44.1 kg to 22.0 kg, from 6.1 kg to 0 kg, and from 14.1 kg to 18.7 kg, respectively.

The obtained alkali metal titanate had a titanium atom content of 50 mass %, a sodium atom content of 8.5 mass %, and a silicon atom content of 0.4 mass %, and the content of the alkali metal atom other than the sodium atom/the content of the sodium atom (mass ratio) was 0. The main crystal thereof had a tunnel structure similarly to potassium hexatitanate, and the single-phase ratio thereof was 94%.

The Vickers hardness of the obtained alkali metal titanate was 279 HV.

Example 7

An alkali metal titanate was prepared in the same manner as in Example 1 except that the amount used of titanium dioxide (titanium dioxide purity: 98.7%) and the amount used of titanium dioxide containing 1.8 mass % of silicon dioxide (titanium dioxide purity: 95%) were changed from 42.5 kg to 0 kg and from 44.1 kg to 88.1 kg, respectively.

The obtained alkali metal titanate had a titanium atom content of 50 mass %, a potassium atom content of 3.6 mass %, a sodium atom content of 6.3 mass %, and a silicon atom content of 1.6 mass %, and the content of the alkali metal atom other than the sodium atom/the content of the sodium atom (mass ratio) was 0.57. The main crystal thereof had a tunnel structure similarly to potassium hexatitanate, and the single-phase ratio thereof was 94%.

The Vickers hardness of the obtained alkali metal titanate was 354 HV.

Comparative Example 1

An alkali metal titanate was prepared in the same manner as in Example 1 except that the amount used of potassium carbonate and the amount used of sodium carbonate were changed from 6.1 kg to 7.3 kg and from 14.1 kg to 13.1 kg, respectively.

The obtained alkali metal titanate had a titanium atom content of 50 mass %, a potassium atom content of 11 mass %, a sodium atom content of 1.6 mass %, and a silicon atom content of 0.8 mass %, and the content of the alkali metal atom other than the sodium atom/the content of the sodium atom (mass ratio) was 6.9. The obtained alkali metal titanate had a single-phase ratio of 96% and a Vickers hardness of 408 HV.

Comparative Example 2

An alkali metal titanate was prepared in the same manner as in Example 1 except that the amount used of titanium dioxide containing 1.8 mass % of silicon dioxide (titanium dioxide purity: 95%), the amount used of titanium dioxide (titanium dioxide purity: 98.7%), the amount used of potassium carbonate, and the amount used of sodium carbonate were changed from 44.1 kg to 0 kg, from 42.5 kg to 85.0 kg, from 6.1 kg to 0 kg, and from 14.1 kg to 18.7 kg, respectively, and 3.0 kg of silicon dioxide (quartz mold, purity 95% or more, manufactured by Kanto Chemical Co., Ltd.) was further added.

The obtained alkali metal titanate had a titanium atom content of 50 mass %, a sodium atom content of 8.5 mass %, and a silicon atom content of 3.0 mass %, and the content of the alkali metal atom other than the sodium atom/the content of the sodium atom (mass ratio) was 0. The single-phase ratio thereof was 77% and the Vickers hardness thereof was 409 HV.

Comparative Example 3

An alkali metal titanate was prepared in the same manner as in Example 1 except that the amount used of potassium carbonate and the amount used of sodium carbonate were changed from 6.1 kg to 24.4 kg and from 14.1 kg to 0 kg, respectively.

The obtained alkali metal titanate had a titanium atom content of 50 mass %, a potassium atom content of 13.9 mass %, and a silicon atom content of 0.8 mass %, and had a single-phase ratio of 96% and a Vickers hardness of 441 HV.

Table 2 shows the results.

Comparative Example 4

An alkali metal titanate was prepared in the same manner as in Example 1 except that the amount used of potassium carbonate and the amount used of sodium carbonate were respectively changed from 6.1 kg to 0 kg and from 14.1 kg to 18.7 kg, and further, the amount used of titanium dioxide (titanium dioxide purity: 98.7%) and the amount used of titanium dioxide containing 1.8 mass % of silicon dioxide (titanium dioxide purity: 95%) were respectively changed from 42.5 kg to 0 kg and from 44.1 kg to 0 kg.

The obtained alkali metal titanate had a titanium atom content of 50 mass %, a sodium atom content of 6.3 mass %, and a silicon atom content of 0.0 mass %, and had a single-phase ratio of 93% and a Vickers hardness of 249 HV.

Table 2 shows the results.

TABLE 2

| | Si atom content | Content of alkali metal atom (M) other than Na atom | | M/Na ratio | Single-phase ratio | Vickers hardness |
|---|---|---|---|---|---|---|
| | mass % | type | (wt %) | (g/g) | (%) | (HV) |
| Example 1 | 0.8 | K | 3.6 | 0.57 | 97 | 302 |
| Example 2 | 0.4 | K | 3.6 | 0.57 | 97 | 281 |
| Example 3 | 0.8 | K | 10.4 | 5.2 | 92 | 351 |
| Example 4 | 0.4 | K | 10.4 | 5.2 | 88 | 306 |
| Example 5 | 0.8 | no | 0 | 0 | 94 | 344 |
| Example 6 | 0.4 | no | 0 | 0 | 94 | 279 |
| Example 7 | 1.6 | K | 3.6 | 0.57 | 94 | 354 |
| Comparative Example 1 | 0.8 | K | 11.0 | 6.9 | 96 | 408 |
| Comparative Example 2 | 3.0 | no | 0 | 0 | 77 | 409 |
| Comparative Example 3 | 0.8 | K | 13.9 | — | 96 | 441 |
| Comparative Example 4 | 0.0 | no | 0 | 0 | 93 | 249 |

As clear from Table 2, the alkali metal titanates according to the present invention obtained in Examples 1 to 7, which contain both of the silicon component and the alkali metal component at a predetermined ratio, not only have heat resistance and friction force suitable for a friction material for brake pads, but also have a Vickers hardness in an appropriate range. Thus, it can be seen that these alkali metal titanates according to the present invention not only improve the slidability of the brake, but also reduce the wear of the brake disc to improve the lifespan thereof. Accordingly, it can be seen that these alkali metal titanates according to the present invention can be suitably used as a constituent material of a friction material such as a brake pad material.

In contrast, the alkali metal titanates obtained in Comparative Examples 1 to 4 do not contain either one or both of the silicon component and the alkali metal component at a predetermined ratio, and accordingly, even though the alkali titanates have a friction force suitable for a friction material for brake pads, the wear of the brake pads is accelerated due to the low Vickers hardness, or the wear of the mating material disposed to face the friction material is increased due to the high Vickers hardness. Thus, it can be seen that those alkali metal titanates cannot be practically used as a constituent material of a friction material such as a brake pad material.

INDUSTRIAL APPLICABILITY

According to the present invention, provide is an alkali metal titanate which, when used as a constituent material of a friction material, is excellent in heat resistance and friction force and capable of effectively suppressing wear of a mating material disposed to face the friction material, and a method for producing the alkali metal titanate and a friction material are also provided.

The invention claimed is:

1. An alkali metal titanate, comprising a sodium atom and a silicon atom,
   wherein a content of the sodium atom is 2.0 to 8.5 mass %,
   a content of the silicon atom is 0.2 to 2.5 mass %, and
   a ratio of a content of an alkali metal atom other than the sodium atom to the content of the sodium atom is 0 to 6 in mass ratio.

2. The alkali metal titanate according to claim 1, wherein the silicon atom is contained in a form of a silicon oxide or a silicate.

3. The alkali metal titanate according to claim 1, wherein the alkali metal atom other than the sodium atom is at least one selected from a lithium atom and a potassium atom.

4. A method for producing the alkali metal titanate according to claim 1, comprising the steps of:
   mixing a titanium raw material, an alkali metal raw material containing the sodium atom, and a silicon raw material; and
   calcining a resulting mixture.

5. The method for producing the alkali metal titanate according to claim 4,
   wherein the alkali metal raw material is an alkali hydroxide, an alkali carbonate, or an alkali-containing mineral.

6. A friction material which is a material containing 5 to 60 mass % of the alkali metal titanate according to claim 1.

7. The alkali metal titanate according to claim 2,
   wherein the alkali metal atom other than the sodium atom is at least one selected from a lithium atom and a potassium atom.

8. A method for producing the alkali metal titanate according to claim 2, comprising the steps of:
   mixing a titanium raw material, an alkali metal raw material containing the sodium atom, and a silicon raw material; and
   calcining a resulting mixture.

9. A method for producing the alkali metal titanate according to claim 3, comprising the steps of:
   mixing a titanium raw material, an alkali metal raw material containing the sodium atom, and a silicon raw material; and
   calcining a resulting mixture.

10. A method for producing the alkali metal titanate according to claim 7, comprising the steps of:
    mixing a titanium raw material, an alkali metal raw material containing the sodium atom, and a silicon raw material; and
    calcining a resulting mixture.

11. The method for producing the alkali metal titanate according to claim 8,
    wherein the alkali metal raw material is an alkali hydroxide, an alkali carbonate, or an alkali-containing mineral.

12. The method for producing the alkali metal titanate according to claim 9,
    wherein the alkali metal raw material is an alkali hydroxide, an alkali carbonate, or an alkali-containing mineral.

13. The method for producing the alkali metal titanate according to claim 10,
   wherein the alkali metal raw material is an alkali hydroxide, an alkali carbonate, or an alkali-containing mineral.

14. A friction material which is a material containing 5 to 60 mass % of the alkali metal titanate according to claim 2.

15. A friction material which is a material containing 5 to 60 mass % of the alkali metal titanate according to claim 3.

16. A friction material which is a material containing 5 to 60 mass % of the alkali metal titanate according to claim 7.

* * * * *